UNITED STATES PATENT OFFICE.

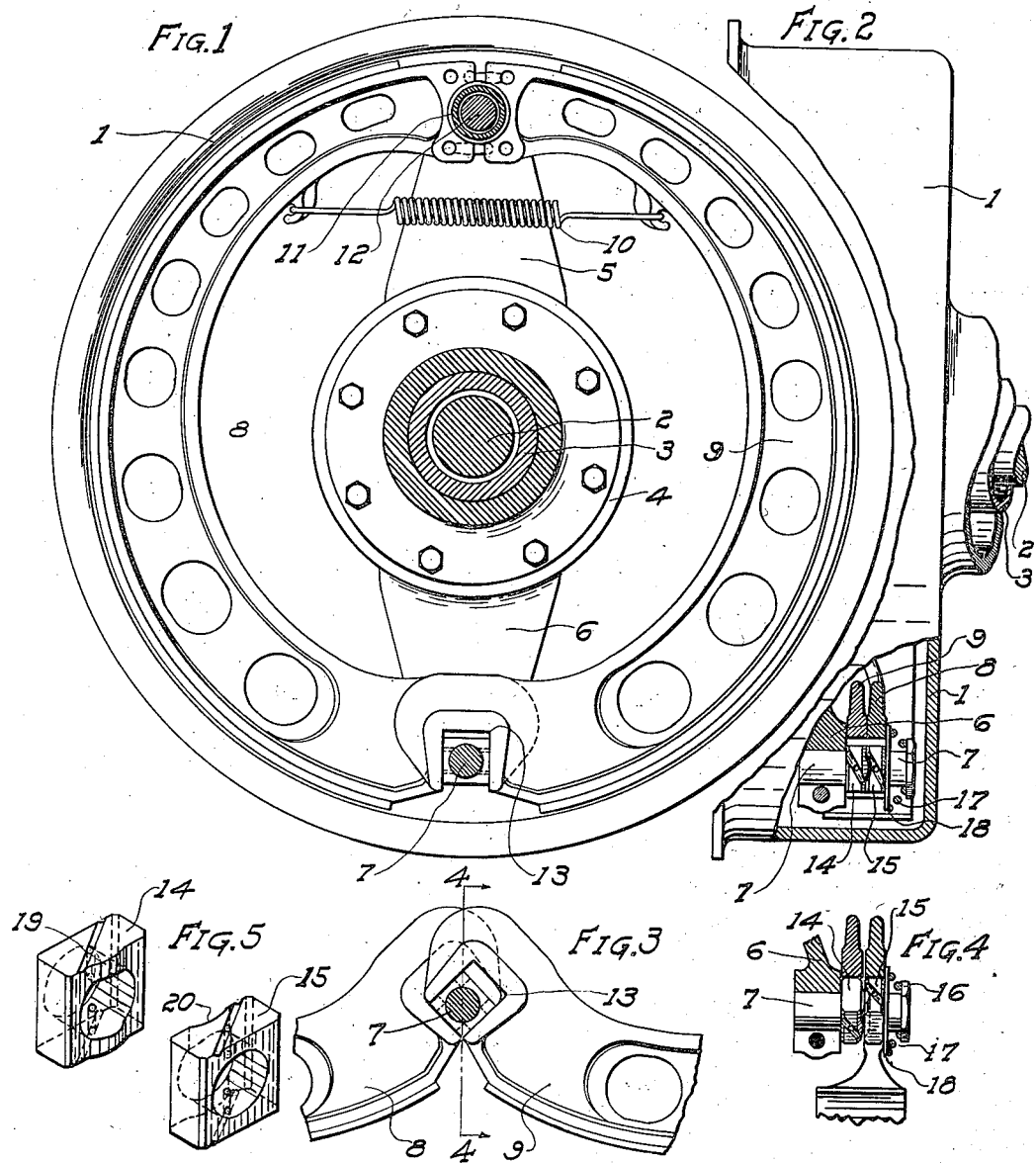

WALTER C. BAKER, OF CLEVELAND, OHIO, ASSIGNOR TO THE STANDARD PARTS COMPANY, OF CLEVELAND, OHIO, A CORPORATION OF OHIO.

BRAKE MECHANISM.

1,426,450.

Specification of Letters Patent. Patented Aug. 22, 1922.

Application filed March 14, 1919. Serial No. 282,636.

*To all whom it may concern:*

Be it known that I, WALTER C. BAKER, a citizen of the United States, and a resident of Cleveland, county of Cuyahoga, State of Ohio, have invented certain new and useful Improvements in Brake Mechanism, of which the following is a specification.

This invention relates to brake mechanism, and particularly to that type of brake mechanism having a drum and a plurality of brake shoes, movable into and out of engagement with said drum.

One object of the invention is to provide supporting means for the brake shoes, which will effectively hold them in position, but permit them to be readily dismounted. Another object of the invention is to provide such a mounting that the brake shoes themselves may be used as lever arms to release resilient holding means and to permit ready removal of the shoes.

Further objects of the invention consist of co-relating the parts and causing them to co-act, as hereinafter described and claimed.

For the purpose of illustration, I have, in the accompanying drawings, shown and described structures embodying my invention.

Figure 1 is a view in elevation of a brake mechanism, certain parts being shown in section;

Figure 2 is a fragmentary side elevation, showing the brake drum partly broken away to disclose a sectional view of part of the brake shoe structure;

Figure 3 is a fragmentary detail of the pivoted ends of the brake shoe in position for dismounting;

Figure 4 is a section on line 4—4 of Figure 3; and

Figure 5 is a perspective view of cam members disassembled, to more clearly show their construction.

In the drawings, 1 indicates a usual form of brake drum which is attached to a vehicle wheel, not shown, and rotates therewith, being driven by an axle 2 and supported upon a tubular axle 3. Mounted upon the tubular axle is a brake anchor 4 comprising diametrically extending arms 5 and 6. The pin 7 is clamped near the end of the arm 6, to furnish a pivot upon which the brake shoes 8 and 9 are mounted for rotation. These shoes are normally held in inoperative position by a spring 10. The construction contemplated involves the use of two pairs of brake shoes, one pair being located on each side of the brake anchor, as in my prior Patent No. 1,132,541, March 16, 1915, but as their construction, and that of their pivoting and operating means, are identical, but one pair will be described.

The free ends of these brake shoes are adapted to be separated by lever mechanism or by cams operated by the shafts 11 and 12, each shaft operating one pair of shoes, as in my aforesaid Patent No. 1,132,541. The pivoted ends of the shoes are recessed as shown in 13, to slidably engage over blocks or pivot members 14 and 15, which are preferably provided with diagonal lubricating grooves, as shown in Figure 5, and the blocks are, in turn, mounted upon the pin 7. The brake shoes are thus capable of a slight radial movement with reference to pin 7 to position themselves in the drum, but are rigidly anchored against rotation around the shaft 2 and swing with blocks 14 and 15 about the pin 7. The pin 7 is provided at the end with a head or nut 16, and between such head or nut and the adjacent brake shoes there is provided a spring 17 and a washer 18, which hold the pivoted ends of the brake shoes tightly together and prevent rattling.

Because of the friction produced by spring 17 between the brake shoes and the arm 6, it is difficult to slide the brake shoes on and off of the blocks 14 and 15 when it is desired to renew them, or any of their parts, or to repair and clean the same. In order to compress the spring and release the brake shoes from this side clamping, I form the blocks 14 and 15 with interfitting cam faces, as shown more particularly at 19 and 20 in Figure 5. The raised face 19 fits into the depression 20 when the parts are in their normal assembled relation, but when it is desired to remove or replace the brake shoes, the wheel with the drum 1 is removed axially, the spring 10 unhooked from one or both of the shoes and the shoes with their respective blocks 14 and 15 swung from the position shown in Figures 1 and 2 to the position indicated in Figures 3 and 4, the raised surface 19 on the block 14 thereby being positioned at right angles to the depression 20 and effecting a separation of the blocks 14 and 15 so as to compress spring 17 and relieve the side pressure on the brake shoes so that they may then be freely removed from or replaced on the blocks 14 and 15.

While I have illustrated and described a preferred form of a device embodying my invention, it will be understood that changes may be made in the details of construction, without departing from the spirit of the invention which is defined in the appended claims.

Having thus described my invention, what I claim is:

1. In brake mechanism, the combination of a brake drum, a brake shoe, means for resiliently holding said brake shoe against lateral movement relative to the central plane of rotation of said brake drum, and means for releasing said holding means and holding said means in released position.

2. In brake mechanism, the combination of a brake drum, a brake shoe, means for normally holding said brake shoe against lateral movement relative to the central plane of rotation of said drum, and means operable by said shoe for releasing said holding means.

3. In brake mechanism, the combination of a brake drum, a brake shoe movable into engagement therewith, means resiliently engaging said shoe to hold it against lateral movement relative to the central plane of rotation of said drum, and means for moving said holding means out of engagement with said shoe.

4. In brake mechanism, the combination of a brake drum, brake shoes pivotally mounted at one end, means normally cooperating with the pivoted ends of said shoes to hold them against lateral movement relative to the central plane of rotation of said drum, and means for positively moving said holding means from cooperating relation with said shoes.

5. In brake mechanism, the combination of a brake drum, brake shoes pivotally mounted at one end, actuating means for engaging said shoes with said drum, means for resiliently holding the pivoted ends of said shoes against lateral movement relative to the central plane of rotation of said drum, and means operable by pivotal movement of said shoes for releasing said holding means.

6. In brake mechanism, the combination of a brake drum, a brake shoe support comprising a pivot, bearing members mounted on said pivot, brake shoes having recesses at the ends thereof to receive said bearing members, and actuating means for said brake shoes, said bearing members having cooperating cam faces whereby relative rotation will cause them to separate along the axis of the pivot.

7. In brake mechanism, the combination of a brake drum, a brake shoe support comprising a pivot, members rotatably mounted thereon, brake shoes slidably mounted at one end upon said members, and resilient means for holding the pivoted ends of said brake shoes against lateral movement relative to the central plane of rotation of said drum, said members being formed with cooperating cam faces, whereby relative rotation of the members will release said shoes from said holding means.

8. In brake mechanism, the combination of a brake drum, a brake shoe support comprising a pivot, members mounted side-by-side thereon, brake shoes having their ends overlapped and slidably mounted upon said members, means resiliently compressing the overlapped ends of brake shoes together, said members being formed with cooperating cam surfaces and adapted, upon relative rotation, to release said overlapped ends from said means.

In testimony whereof I affix my signature.

WALTER C. BAKER.